United States Patent Office 3,034,497
Patented May 15, 1962

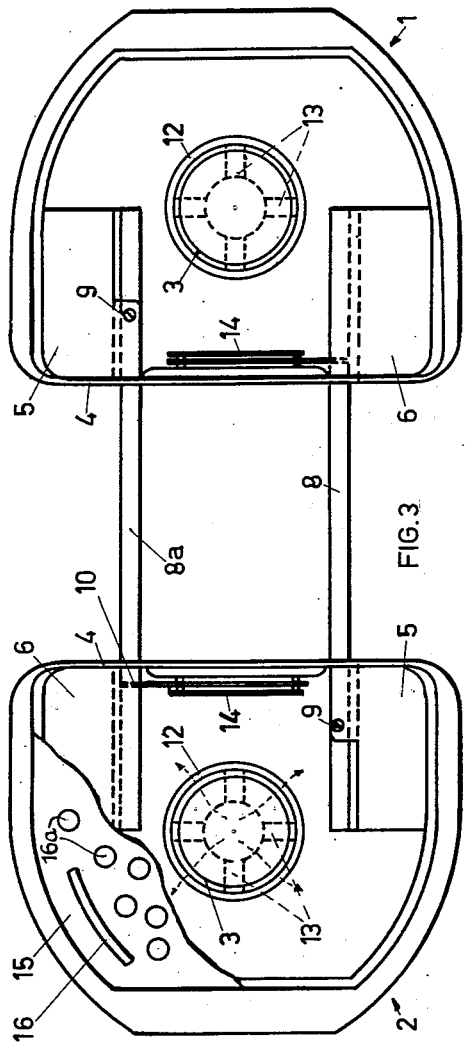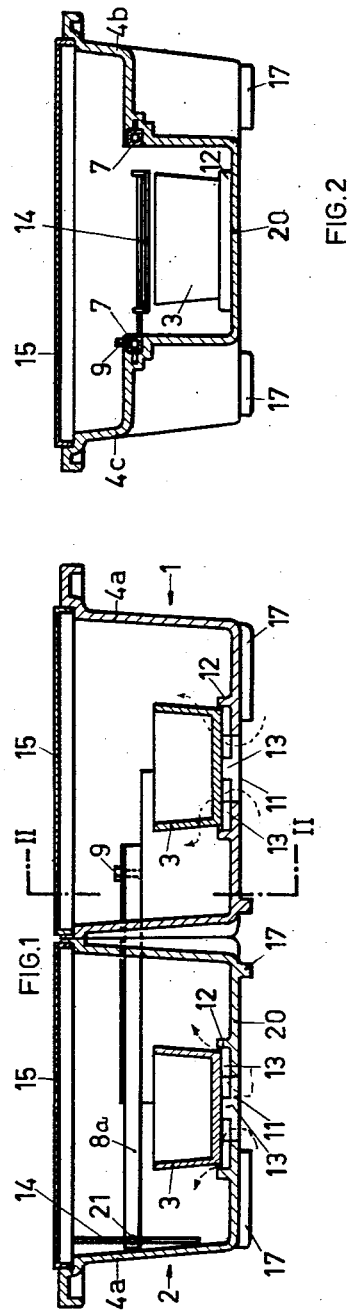

3,034,497
ADJUSTABLE HEATERS
Hans Wehrli, Zurcherstrasse 81, Rapperswil, Switzerland
Filed July 24, 1959, Ser. No. 829,450
Claims priority, application Switzerland July 30, 1958
3 Claims. (Cl. 126—261)

This invention relates to heaters having a plurality of heating means which can be adjustably spaced from each other.

It is an object of this invention to provide a heater comprising a plurality of heating means which can be adjustably spaced from each other in a number of selected positions so as to heat dishes of different sizes.

It is a further object of this invention to provide a heater having two heating means and adjustable spacing means for moving the heating means into a number of selected positions whereby dishes of different sizes can be heated and supported by the two heating means.

It is a still further object of this invention to provide an adjustable heater of simple construction, which can be stored in a small space.

It is a still further object of this invention to provide a heater comprising two heating units adapted to be adjustably moved between two end positions and wherein the heating is selectively interrupted in the end position.

With these objects in view a heater according to this invention comprises, in combination, a plurality of heating means and adjustable spacing means for moving said heating means relative to each other to a number of selected positions whereby dishes of different sizes can be heated and supported by the heating means.

Preferably the heating means are mounted in support means each having annular side walls and a bottom wall.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a sectional elevational view of a heater according to this invention;

FIG. 2 is a section along lines II—II of FIG. 1; and

FIG. 3 is a plan view of the device according to this invention in which the heating means are spaced from each other.

Referring to the drawings the heater comprises separate support means 1 and 2 each having side walls 4, 4a, 4b, and 4c, a bottom wall 20 and top wall 15. Top wall 15 is preferably in the form of a cover having apertures 16 and a plurality of substantially circular apertures 16a formed therein. From bottom wall 20 extend the leg means 17 having a shape generally conforming to the shape of the apertures 16 so that when one support means is superimposed upon the other, leg means 17 will fit in apertures 16. The superimposed support means are thus secured against movement relative to each other and occupy very little space.

Bottom wall 20 is provided with apertures 11 and with a ring 12 surrounding the apertures so that heating means shown in the form of a burner support 3 can be placed and held within the ring 12. Ribs 13 formed within the space of ring 12 also support the burner support 3 and allow air to pass underneath the support 1 into the interior thereof. Air passing through apertures 11 and between ribs 13 will also cool the bottom wall 20 and support 3. Spacing means comprise the brackets 5 and 6 near walls 4 and bars 8 and 8a. Grooves 7 are provided in each of the brackets 5 and 6. As shown in FIG. 3 bar 8a is secured by screw 9 in groove 7 of support means 1 and slidable in the corresponding groove 7 of support means 2. Correspondingly, bar 8 is held by screw 9 in groove 7 of support means 2 and is slidably mounted in groove 7 of support means 1. In this way the adjustable spacing means allows spacing of support means 1 and 2 and of the heating means in a number of selected positions. Limiting means in the form of abutments 10 are provided on bars 8 and 8a in order to limit movement of support means 1 and 2. The limiting means preferably comprises a rod 21 on which flap 14 is turnably mounted. As shown in FIGS. 1 and 2, flap 14 takes up a vertical position when support means 1 and 2 are in one of their end positions in relation to each other.

When support means 1 and 2 are moved from the end positions, flap 14 will be turned by burner support means 3 around rod 21 so that in one intermediate position flap 21 will cover the rim of the cup shaped burner support 3. A burner placed in burner support 3, such as a candle or a spirit burner, will thus be extinguished. Flaps 14 form therefore means for interrupting operation of the burners during movement of the support means 1, 2 between the end positions thereof. When support means 1 and 2 are moved to the position shown in FIG. 3, a flap 14 will be moved by the inclination of a side wall 4 back into its vertical position. When support means 1 and 2 are moved to the position of FIG. 1, a flap 14 will be turned in a horizontal position by the burner support 3 extinguishing the burner and will be turned into a substantial vertical position by the side wall 4a. Walls of supports 1 and 2 are parallel so that supports 1 and 2 will provide a practically continuous support for dishes in this position.

The heating means illustrated in the drawings comprise a burner support 3. Electrical heating elements may be arranged in burner support 3 and manually switched on and off. On the other hand a plug may be mounted on one of the support means which plug disconnects one of the heating elements when the support means are spaced furthest apart.

By selection of a suitable distance between supports 1 and 2 dishes of various sizes can be heated by the novel heater according to this invention. When support means 1 and 2 are placed apart from each other either a large dish or a number of small dishes can be placed thereon to be heated. The heating means contained in the individual supports can be operated according to the requirements. That means they can all be in operation or they can be extinguished separately as desired.

The preferred means for extinguishing burners assure that in one or the other or in both positions support means are not heated unnecessarily. The flaps can however be easily removed or can be omitted, if so desired.

Flap 14 need not be turnably mounted on rod 21. If there is sufficient space, flap 14 can remain in a horizontal position in which case a simpler construction is obtained. The flap itself can be either planar or slightly curved.

It can be seen that the novel construction provides a heater particularly adapted to heat large dishes while the construction requires very little space in storage particularly since a number of them can be superimposed upon each other for storage in a small place.

It will be understood that each of the elements described above, or two or more together, may also find a useful application in other types of heaters differing from the types described above.

While the invention has been illustrated and described as embodied in adjustable heater for dishes, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What is claimed as new and desired to be secured by Letters Patent is:

1. A heater, comprising, in combination, two support means each having annular side walls and a bottom wall, said bottom wall being formed with apertures; intermittently operable burner means supported respectively by said bottom walls; adjustable spacing means mounted on one of said support means and slidably guided in the other of said support means for moving said support means and said burner means to a number of selected positions between two end positions; and means turnably mounted on said spacing means for interrupting the operation of said burner means when said support means are moved between said end positions and including limiting means for limiting the movement of said support means from each other whereby dishes of different sizes can be heated by said burner means and be supported by said support means.

2. A heater comprising, in combination, a pair of support means each having a top wall, said top walls being located in one plane so that a dish may be supported on the top walls; a pair of heating means respectively carried by said support means beneath the top walls thereof so that a dish supported on said top walls may be kept warm by said heating means; adjustable elongated spacing means slidably mounted in said support means for permitting movement of said pair of support means and said heating means carried thereby between a pair of end positions toward and away from each other while keeping said top walls of said supporting means aligned in one plane, whereby dishes of different sizes may be supported on said aligned top walls to be kept warm by the heating means carried beneath said top walls, said elongated adjustable spacing means extending from the interior of one of said support means into the interior of the other of said support means; and combined limiting and interrupter means operatively connected to said elongated spacing means and engaging said support means at least in one of said end positions thereof for limiting the movement of said support means away from each other and said combined limiting and interrupter means moving during movement of said support means between said end positions over said heating means for interrupting operation of said heating means when said support means are moved between said end positions thereof.

3. A heater comprising, in combination, a pair of support means each including a cup-shaped bottom member open at the top thereof and having a side wall portion facing and substantially parallel to the corresponding side wall portion of the cup-shaped bottom member of the other support means, and a top plate located in and substantially closing the open top of said cup-shaped bottom member, said top plates of said pair of support means being located substantially in one plane so that a dish may be supported on said top plates; a pair of burner means respectively carried in said cup-shaped bottom member of said support means beneath and spaced from the top plates thereof; elongated adjustable spacing means extending substantially normal to said wall portions of said cup-shaped bottom members for permitting movement of said pair of support means and said burner means carried thereby between an inner end position in which said substantially parallel side wall portions of said cup-shaped bottom members abut against each other and an outer position in which said side wall portions are spaced from each other while keeping said top plates of said supporting means aligned in one plane, whereby dishes of different sizes may be supported on said aligned top walls to be kept warm by said burner means carried beneath said top walls, said elongated spacing means comprising two elongated bars located between said top plates and said heating means and one of said bars being fastened at one end thereof in the interior of one of said cup-shaped bottom members, extending with a free end thereof through said side wall portions into the interior of the other of said cup-shaped bottom members and being slidably guided therein, and the other of said bars being fastened at one end thereof in the interior of the other of said cup-shaped bottom members, extending with a free end thereof through said side wall portions into the interior of said one cup-shaped bottom member and being slidably guided therein; and a pair of flaps respectively turnably mounted on the free ends of said bars, said flaps moving over said burner means during movement of said support means between said end positions thereof so that said burner means may be extinguished during this movement and said flaps abutting respectively against said side wall portions when said supporting means are in said outer end positions thereof so as to limit the movement of said support means away from each other.

References Cited in the file of this patent

UNITED STATES PATENTS

| | | |
|---|---|---|
| 2,211,924 | Forster | Aug. 20, 1940 |
| 2,891,465 | Rogge | June 23, 1959 |

FOREIGN PATENTS

| | | |
|---|---|---|
| 285,085 | Switzerland | Dec. 1, 1952 |